United States Patent
Bruyneel et al.

(10) Patent No.: US 6,920,745 B2
(45) Date of Patent: Jul. 26, 2005

(54) ZINC-COATED STEEL CORD WITH IMPROVED FATIGUE RESISTANCE

(75) Inventors: Paul Bruyneel, Ooigem (BE); Eric Bruneel, Roeselare (BE); Frans Van Giel, Kortrijk (BE)

(73) Assignee: N.V. Bekaert S.A., Zwevegem (BE)

( * ) Notice: Subject to any disclaimer, the term of this patent is extended or adjusted under 35 U.S.C. 154(b) by 84 days.

(21) Appl. No.: 10/275,438

(22) PCT Filed: Apr. 19, 2001

(86) PCT No.: PCT/EP01/04447

§ 371 (c)(1),
(2), (4) Date: Nov. 6, 2002

(87) PCT Pub. No.: WO01/86058

PCT Pub. Date: Nov. 15, 2001

(65) Prior Publication Data

US 2003/0106300 A1 Jun. 12, 2003

(30) Foreign Application Priority Data

May 8, 2000 (EP) .......................... 00201661

(51) Int. Cl.$^7$ ................................ D02G 3/48
(52) U.S. Cl. .......................... 57/237; 57/241
(58) Field of Search ............... 57/212–214, 216, 57/218, 220, 222, 230, 231, 236–238

(56) References Cited

U.S. PATENT DOCUMENTS

| | | | |
|---|---|---|---|
| 3,778,994 A | * | 12/1973 | Humphries .................. 57/214 |
| 4,681,558 A | * | 7/1987 | Rausch ....................... 474/205 |
| 5,020,312 A | * | 6/1991 | Watakabe .................... 57/200 |
| 5,342,699 A | | 8/1994 | DeWitte et al. |
| 5,669,214 A | * | 9/1997 | Kopanakis ................... 57/218 |
| 5,687,557 A | * | 11/1997 | De Vos et al. ............... 57/214 |
| 5,784,874 A | * | 7/1998 | Bruyneel et al. ............. 57/237 |
| 5,878,564 A | * | 3/1999 | De Vos et al. ............... 57/311 |
| 5,993,924 A | * | 11/1999 | Deroch et al. .............. 428/36.91 |
| 6,334,293 B1 | * | 1/2002 | Poethke et al. .............. 57/210 |
| 2003/0000619 A1 | * | 1/2003 | Nakamura et al. ........... 152/525 |

FOREIGN PATENT DOCUMENTS

| | | | |
|---|---|---|---|
| GB | 2 252 744 A | | 8/1992 |
| JP | 2003268686 A | * | 9/2003 ........... D07B/07/02 |
| WO | WO99/20682 A1 | | 4/1999 |
| WO | WO99/55793 A1 | | 11/1999 |

OTHER PUBLICATIONS

Http://www.corrosion–doctors.org/MetalCoatings/Galvanizing.htm (Feb. 22, 2001).*
Http://www.mazenails.com/hdgspecs.htm (Dec. 2, 2003).*
"Reinforcement of Conveyor Belts", Research Disclosure, No. 320, Dec. 1990, pp. 941–943.

* cited by examiner

Primary Examiner—John J. Calvert
Assistant Examiner—Shaun R Hurley
(74) Attorney, Agent, or Firm—Foley & Lardner LLP

(57) ABSTRACT

A steel cord for the reinforcement of thermoplastic elastomers, the steel cord including more than one strand, each strand including two or more steel filaments, at least some of said the steel filaments being provided with a zinc coating. The zinc coating has a thickness lower than two micrometer and an alloy layer zinc-steel is present between the zinc coating and the steel.

14 Claims, 2 Drawing Sheets

ZINC-COATED STEEL CORD WITH IMPROVED FATIGUE RESISTANCE

FIELD OF THE INVENTION

The present invention relates to a steel cord adapted for the reinforcement of thermoplastic elastomers and to a composite. The composite comprises a thermoplastic elastomer such as polyurethane as matrix and the steel cords as reinforcing material. The steel cord is a multi-strand steel cord, i.e. a steel cord comprising more than one strand.

BACKGROUND OF THE INVENTION

Steel cords are widely known to reinforce rubber products such as tires and conveyor belts. To a lesser extent, steel cords are also known to reinforce thermoplastic elastomers such as polyurethanes. The adhesion mechanism between the steel cords and the rubber products is substantially different from the adhesion mechanism between steel cords and thermoplastic elastomers. The adhesion between steel cords and rubber is mainly a chemical adhesion based on the bonds created during vulcanization between a conventional copper alloy coating on the steel cord and the rubber. Although chemical adhesion is not excluded between steel cords and thermoplastic elastomers, the adhesion mechanism is substantially based on a mechanical anchoring between the steel cords and the matrix.

Due to this basic difference, steel cords for rubber reinforcement have known another evolution than steel cords for reinforcement of thermoplastic elastomers.

With respect to rubber reinforcement, there has been an evolution towards single-strand cords such as compact cords, lesser filaments in one steel cord (even ending up in single filament reinforcements), thicker filament diameters.

With respect to reinforcement of thermoplastic elastomers, the multi-strand steel cords, i.e. steel cords comprising more than one strand, have remained the standard because the rougher outer surface of such a multi-strand steel cord offers more mechanical anchoring in the matrix than a single-strand steel cord.

Another consequence of the different adhesion mechanism between steel cords adapted for the reinforcement of rubber products and steel cords adapted for the reinforcement of thermoplastic elastomers, is the type of coating applied to the steel filaments. Whereas steel cords for rubber reinforcement, particularly for tires, have a conventional copper alloy coating such as brass, steel cords for the reinforcement of thermoplastic elastomers conveniently have a zinc or zinc alloy coating. Such a zinc coating, however, has its drawbacks.

A first drawback is that a suitable level of corrosion resistance is difficult to combine with an acceptable level of fatigue resistance. Indeed increasing the thickness of the zinc coating leads to an increase of the corrosion resistance, which is an advantage, and to a decrease in fatigue resistance, which is a disadvantage, and vice versa.

A second drawback is that a zinc coating creates a lot of zinc dust and zinc particles during the downstream working of the zinc coated filaments such as the cold drawing and the twisting into the strands and cord.

SUMMARY OF THE INVENTION

It is an object of the invention to avoid the drawbacks of the prior art. It is another object of the invention to provide a steel cord with a coating, which has both an acceptable degree of fatigue resistance and an acceptable degree of corrosion resistance.

According to the invention, there is provided a steel cord adapted for the reinforcement of thermoplastic elastomers. The steel cord is a so-called multi-strand steel cord, i.e. the steel cord comprises more than one strand. Each strand comprises two or more steel filaments. At least some of the steel filaments are provided with a zinc coating. The zinc coating has a thickness lower than two micrometer, preferably lower than one micrometer, e.g. 0.5 µm. An alloy layer zinc-steel is present between the zinc coating and the steel.

The typical zinc coating, i.e. a relatively thin zinc coating (common zinc coatings have a thickness greater than 3 to 5 micrometer) in combination with the presence of a transition alloy layer zinc-steel has following advantages.

The thin coating has the advantage of producing less dust of zinc during the downstream drawing and twisting of the steel cord. The decrease in zinc dust and zinc particles at the surface of the steel cord leads to a better mechanical anchoring in the thermoplastic elastomer.

The presence of the transition layer of a zinc-steel alloy between the steel and the zinc increases the corrosion resistance of the steel filaments and increases the adhesion between the zinc coating and the steel. The presence of this alloy layer leads to an even further reduction of zinc dust and, as a consequence, to a better anchoring of the steel cord with the zinc coating in the thermoplastic elastomer.

With respect to the cord core, two alternatives are possible: a cord core in the form of a core strand with two or more filaments and a cord core in the form of a plastic material, e.g. of the same type and nature of the thermoplastic elastomer of the matrix.

Amongst the various constructions tested by the inventors, a 7×7 construction with following parameters has proved to provide excellent results with respect to mechanical anchoring, fatigue resistance, fretting behavior and corrosion resistance:

$$d_1 + 6 \times d_2 + 6 \times (d_2 + 6 \times d_3)$$

with $d_1 > 1.05 \times d_2$ $d_2 > 1.05 \times d_3$

The invention also relates to a composite reinforced by a steel cord as described hereabove. An example of such a composite is a belt, e.g. a grooved belt, with polyurethane as matrix

BRIEF DESCRIPTION OF THE DRAWINGS

The invention will now be described into more detail with reference to the accompanying drawings wherein.

DESCRIPTION OF THE PREFERRED EMBODIMENTS OF THE INVENTION

Figure 1:
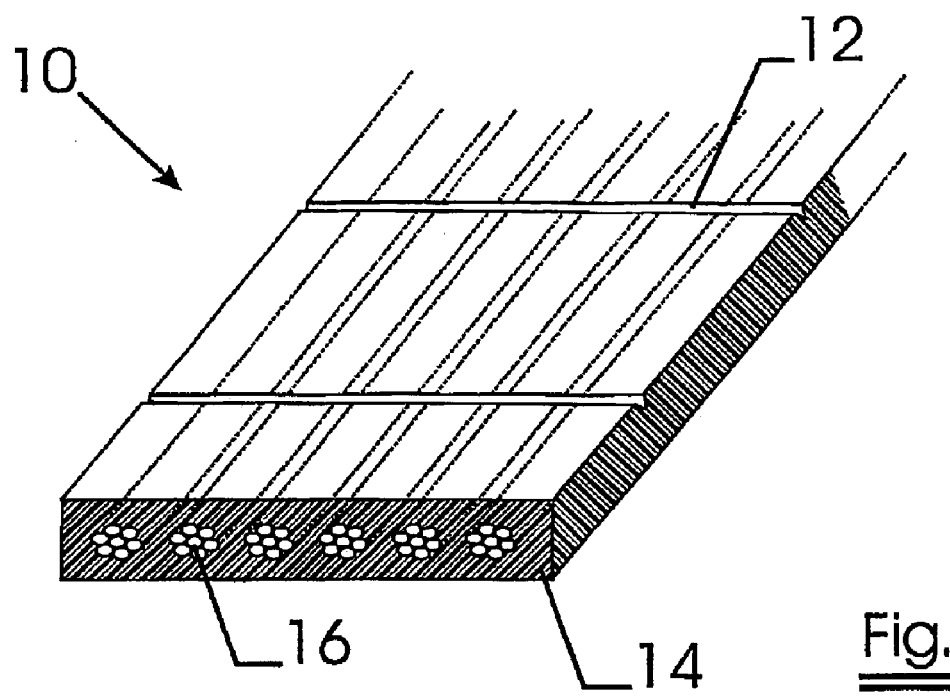
FIG. 1 shows a schematic view of a composite belt according to the invention.

FIG. 1 shows a schematic view of a composite belt 10 according to the invention. The belt 10 is provided with grooves 12, which is a result of its manufacturing process: the grooves are located at the places where teeth were guiding the belt 10.

As an alternative, grooves or teeth may also be present in the longitudinal direction of the belt so as to constitute a so-called V-grooved belt (not shown).

The belt 10 has a matrix material 14 out of polyurethane. Other suitable thermoplastic elastomers are thermoplastic polyolefin homopolymers or copolymers, olefinic rubbers, block-copolymers of styrene/conjugated diene/styrene and/or its fully or partially hydrogenated derivative, optionally compounded with a thermoplastic polyolefin homopolymer or copolymer, or blends of the foregoing. Such thermoplastic elastomers are described in more detail in WO-A-99/55793 (Advanced Elastomer Systems and N.V. Bekaert S.A.).

The belt 10 is further reinforced with several steel cords 16, which are lying in parallel adjacent to each other.

Steel cords adapted for the reinforcement of thermoplastic elastomers have, either alone or in combination, following features:
- steel filaments with a diameter ranging from 0.05 mm to 0.80 mm, preferably from 0.06 mm to 0.40 mm;
- the steel filaments have a steel composition which is along the following lines: a carbon content ranging from 0.60% to 1.05%, a manganese content ranging from 0.10% to 1.10%, a silicon content ranging from 0.10% to 0.90%, sulfur and phosphorous contents being limited to 0.15%, preferably to 0.10%;
- additional micro-alloying elements such as chromium (up to 0.20%–0.40%), copper (up to 0.20%) and vanadium (up to 0.30%) may be added;
- although not strictly necessary since the mechanical anchoring is the main adhesion mechanism, the steel cords may be provided with an additional chemical adhesion system such as described in the already mentioned WO-A-99/55793 or such as provided in WO-A-99/20682 (N.V. Bekaert S.A.).

Starting from a steel wire rod with the above-mentioned composition makes a composite product according to the invention. The steel rod is cold drawn to the desired filament diameters. The subsequent cold drawing steps may be alternated by suitable thermal treatments such as patenting, in order to allow for further drawing. Once the final diameters are obtained, the drawn filaments are twisted to a strand, and a number of strands are twisted to a steel cord. Conventional apparatus such as double-twisters ("bunching apparatus) or such as tubular rotary machines ("cabling apparatus) may do the twisting operations. A multiple of the twisted steel cords are then drawn and straightened from supply spools, laid in parallel adjacent each other and fed through insert holes to an extrusion apparatus where the thermoplastic elastomer is added.

Other composite products according to the invention with a parallel and straight pattern of steel cord reinforcement are: sheet-linings, snap-on profiles, cut-resistant flexible and protective strips, handrails etc.

Figure 2:
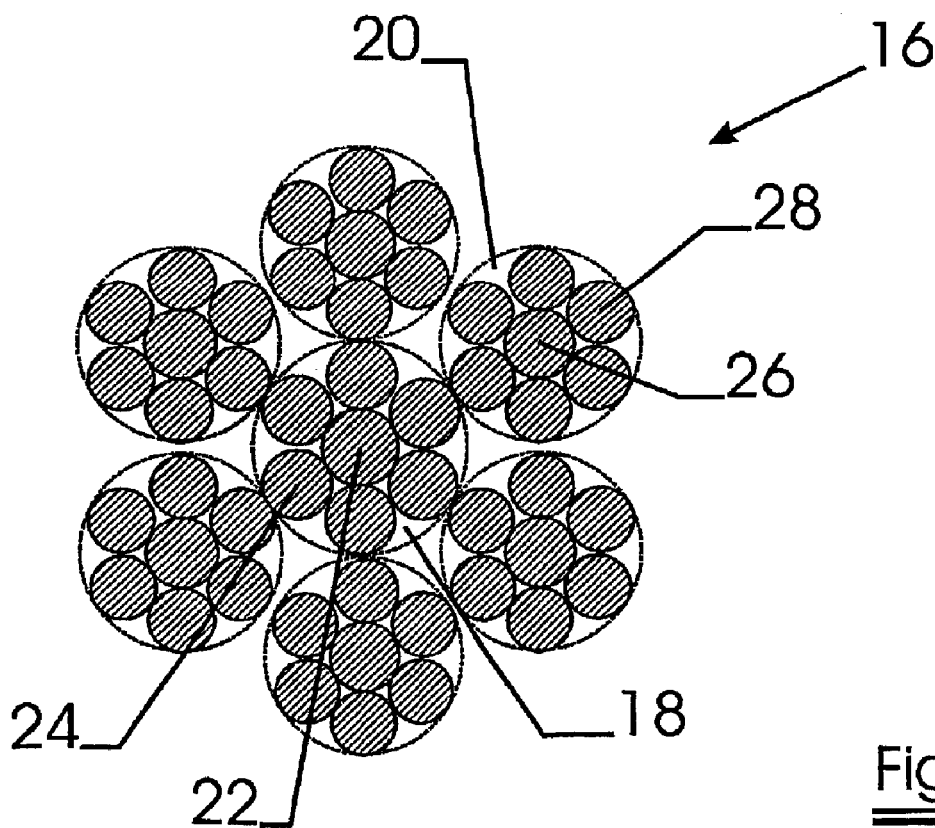
FIG. 2, FIG. 3 and FIG. 4 all show cross-sections of steel cords for the reinforcement of a composite according to the invention.

FIG. 2 shows the cross-section of a steel cord 16, which has proved to be a preferable reinforcement for the composite 10.

Steel cord 16 comprises a core strand 18 and six outer strands 20. Core strand 18 comprises a filament 22 as core and six filaments 24 twisted around the filament 22. The diameter $d_1$ of filament 22 is at least 5% greater than the diameter $d_2$ of the filaments 24. The outer strands 20 each comprise a filament 26 as core and six filaments 28 twisted around the filament 26. The filament 26 may have the same diameter $d_2$ as the filaments 24. The diameter $d_2$ of filament 26 is at least 5% greater than the diameter $d_3$ of filaments 28.

An example of a preferable construction is (all diameters being expressed in mm):

$$(0.21+6\times0.19)+6\times(0.19+6\times0.175) \quad (a)$$

The steel cord filaments are all provided with a thin zinc coating with an average thickness of about 0.5 µm to 1.0 µm.

The table hereunder summarizes the mechanical properties of this cord.

TABLE 1

|  | Twist direction Z | Twist direction S |
|---|---|---|
| Linear density (g/m) | 10.13 | 10.03 |
| Breaking Load $F_m$ (N) | 3139 | 3139 |
| Tensile strength $R_m$ (MPa) | 2436 | 2459 |
| Yield strength at 0.2% permanent elongation $R_{p0.2}$ (MPa) | 2067 | 2103 |
| $R_{p0.2}/R_m$ (%) | 85 | 86 |
| Modulus of elasticity $E_{mod}$ (MPa) | 139103 | 145156 |
| Permanent elongation at maxim load Ag (%) | 1.14 | 1.25 |
| Percent total elongation at fracture $A_t$ (%) | 2.95 | 2.95 |
| Preformation degree of outer strands (%) | 97 | 98 |

In a belt endurance test with following test conditions:
pulley diameter r=40 mm
axial load=150 kg
frequency=100 cycles per minute
This cord (a) has been compared with following cord:

$$(0.20+6\times0.175)+6\times(0.175+6\times0.175) \quad (b)$$

For cord (b) friction corrosion was visible after 2 150 000 cycles, whereas for cord (a) no friction corrosion was visible after 2 150 000 cycles.

The above steel cord corresponds to the general formula: 7×7. Other suitable steel cord constructions are (subject to the required openness and deformation degree of the outer strands):
19+8×7
7×19
1×7+7×7
19+9×7
1×3+5×7

Figure 3:
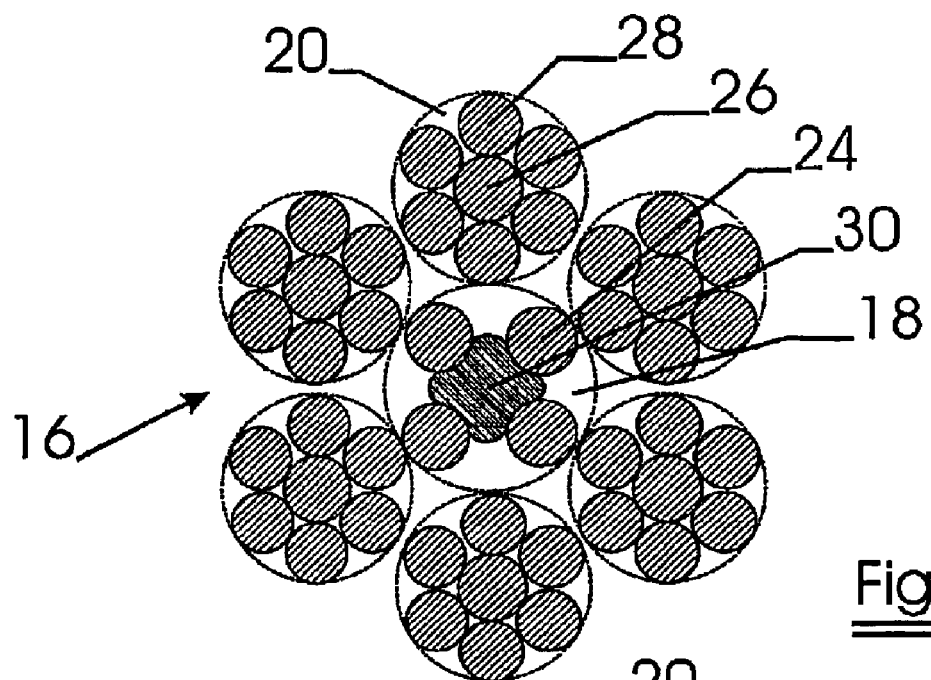

FIG. 3 illustrates an alternative steel cord 16 for the reinforcement of a composite according to the invention. The main difference with steel cord (a) of FIG. 1 is that the core of the core strand is now a plastic material 30, e.g. a polyurethane of the same family as the matrix material to be reinforced. This plastic material 30 is necessary to prevent the filaments 24 from forming a completely closed structure. The steel filaments are also all provided with a thin zinc coating with an average thickness of about 0.5 µm to 1.0 µm.

Figure 4:
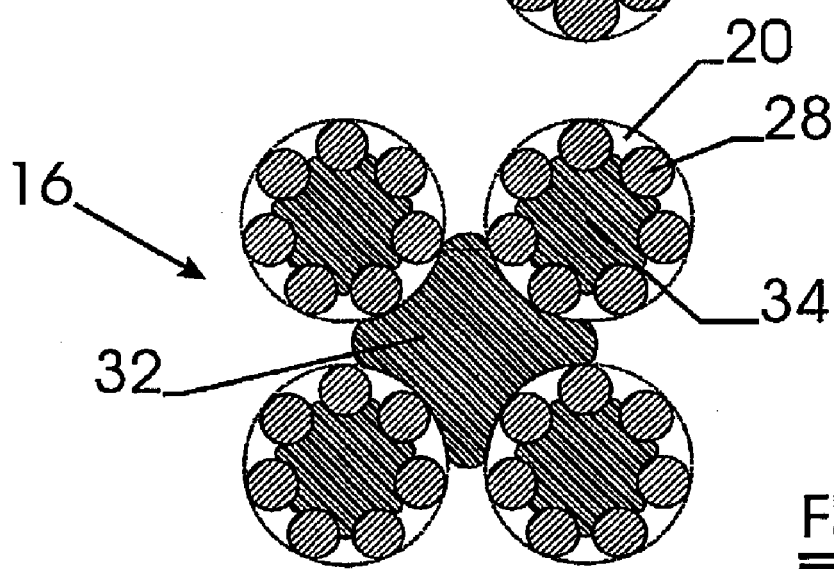

FIG. 4 illustrates yet another alternative steel cord 16 for the reinforcement of a composite according to the invention. The core of the steel cord 16 is now completely formed by a plastic material 32, which is thick enough to prevent the strands 20 from forming a closed structure and from contacting each other. So plastic material 32 helps to obtain an open structure and helps to avoid fretting between adjacent strands 20.

On a strand level, the core of each strand 20 is formed by another plastic material 34. Seven outer filaments 28 surround this other plastic material 34.

Here again, the steel cord filaments are all provided with a thin zinc coating with an average thickness of about 0.5 µm to 1.0 µm.

Figure 5:
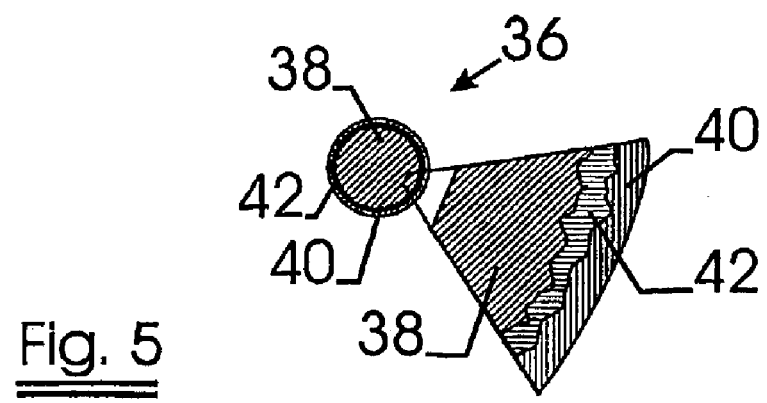
FIG. 5 shows a cross-section of a steel filament with a zinc coating.

FIG. 5 shows the cross-section of a zinc coated steel filament 36 in accordance with the invention. Steel filament 36 has a steel core and a zinc coating 40 of less than 2 micrometer. Between the steel core 38 (about 100% steel)

and the zinc coating 40 (about 100% zinc), a transition layer 42 of a zinc-steel alloy is present.

Such a transition layer can be obtained if, in contrast with an electrolytic deposition method of zinc, the steel wire is zinc coated by means of a hot dip operation. In a hot dip operation the steel wire travels through a bath of molten zinc and leaves the bath zinc coated.

If the steel wire leaves the bath vertically, a thick zinc layer is present together with a relatively thick and rough zinc-steel alloy layer. Both the thick zinc layer and the steel-zinc alloy layer have disadvantages. The thick zinc layer produces too much zinc dust and zinc particles during the subsequent drawing and twisting steps. The steel-zinc alloy layer, although increasing the corrosion resistance, is quite brittle and results in a decrease in fatigue resistance.

If the steel wire leaves the bath under a small angle with respect to a horizontal line and if the leaving steel wire is wiped mechanically, e.g. by means of a ceramic cloth, three differences are noticed with respect to the vertical leaving:
(a) a reduced thickness of the zinc coating;
(b) a reduced thickness of the zinc-steel transition layer;
(c) a reduction in the roughness of the zinc-steel transition layer.

All three differences together lead to a reconciliation between the two conflicting requirements of sufficient fatigue resistance and sufficient corrosion resistance.

The reduced thickness of the zinc coating (a) and the reduced thickness of the zinc-steel transition layer (b) leads to an increase in the fatigue resistance.

The presence of the zinc-steel transition layer (b) results in an acceptable corrosion resistance, which is significantly higher than in case there is no zinc-steel transition layer.

The reduced thickness of the zinc coating (a) and the reduction in the roughness of the zinc-steel transition layer (c) leads to less production of zinc dust and zinc particles during the subsequent cold drawings steps. The reduction in thickness of the zinc coating (a), the cold drawing does not lead to more fractures during the cold drawing steps and twisting steps since the brittle transition layer is also reduced in thickness (b) and since the transition layer has a reduced roughness (c).

Table 2 hereunder gives and indication of the difference in fatigue resistance between a reference steel cord ① composed of steel filaments hot dip coated with zinc and leaving vertically the zinc bath and an invention steel cord ② hot dip coated with zinc and leaving the zinc bath under a small angle with the horizontal plane.

TABLE 2

|  | Reference steel cord ① | Invention steel cord ② |
|---|---|---|
| Weight of zinc (g/kg) | 80.1 | 26.1 |
| Thickness of zinc (μm) | 3.3 | 1.1 |
| Dry Hunter fatigue resistance (relative terms) | 100 | 131 |
| Wet Hunter fatigue resistance (relative terms) | 100 | 117 |
| Number of bending cycles before fracture of embedded cord under tensile load (relative terms) | 100 | 472 |

What is claimed is:

1. A steel cord adapted for the reinforcement of thermoplastic elastomers, said steel cord comprising more than one strand, the strands comprising two or more steel filaments, at least some of said steel filaments being provided with a zinc coating, wherein said zinc coating has a thickness lower than two micrometers and a zinc-steel alloy layer is present between the zinc coating and the steel.

2. A steel cord according to claim 1 wherein said zinc coating has a thickness lower than one micrometer.

3. A steel cord according to claim 1, wherein said steel cord comprises a cord core and three or more outer strands twisted around said cord core and contacting said cord core.

4. A steel cord according to claim 3 wherein said cord core is a plastic material.

5. A steel cord according to claim 3 wherein said cord core is a core strand with two or more filaments.

6. A steel cord according to claim 5, wherein said steel cord is a steel cord with a core strand and six outer strands according to the formula:

$$d_1 + 6 \times d_2 + 6 \times (d_2 + 6 \times d_3)$$

with $d_1 > 1.05 \times d_2$ and $d_2 > 1.05 \times d_3$.

7. A composite comprising a thermoplastic elastomer as matrix material and a steel cord according to claim 1 as reinforcing material.

8. A composite according to claim 7 wherein said composite is a belt.

9. A composite according to claim 8 wherein said belt is a grooved belt.

10. A composite according to claim 7, wherein said thermoplastic elastomer is a polyurethane.

11. A method of manufacturing a steel cord according to claim 1, comprising the following actions:
   (a) obtaining a steel filament;
   (b) passing the steel filament through a bath of molten zinc such that the steel filament leaves the bath under a small angle with respect to a horizontal line and is coated with zinc, and mechanically wiping the steel filament coated with zinc, wherein, after wiping, the steel filament has a zinc-steel alloy layer covered by a zinc coating having a thickness lower than one micrometer; and
   (c) forming a steel cord according to claim 1 with steel filaments coated with zinc obtained by actions (a)–(b).

12. A method of manufacturing a steel cord according to claim 2, comprising the following actions:
   (a) obtaining a steel filament;
   (b) passing the steel filament through a bath of molten zinc such that the steel filament leaves the bath under a small angle with respect to a horizontal line and is coated with zinc, and mechanically wiping the steel filament coated with zinc, wherein, after wiping, the steel filament has a zinc-steel alloy layer covered by a zinc coating having a thickness lower than one micrometer; and
   (c) forming a steel cord according to claim 2 with steel filaments coated with zinc obtained by actions (a)–(b).

13. A method of manufacturing a composite according to claim 7, comprising the following actions:
   (a) obtaining a steel filament;
   (b) passing the steel filament through a bath of molten zinc such that the steel filament leaves the bath under a small angle with respect to a horizontal line and is coated with zinc, and mechanically wiping the steel filament coated with zinc, wherein, after wiping, the steel filament has a zinc-steel alloy layer covered by a zinc coating having a thickness lower than one micrometer; and
   (d) forming the composite according to claim 7 with steel filaments coated with zinc obtained by actions (a)–(b).

14. A method of manufacturing a composite according to claim 8, comprising the following actions:
   (a) obtaining a steel filament;

(b) passing the steel filament through a bath of molten zinc such that the steel filament leaves the bath under a small angle with respect to a horizontal line and is coated with zinc, and mechanically wiping the steel filament coated with zinc, wherein, after wiping, the steel filament has a zinc-steel alloy layer covered by a zinc coating having a thickness lower than one micrometer; and (d) forming the composite according to claim 8 with steel filaments coated with zinc obtained by actions (a)–(b).

* * * * *